United States Patent
Kim et al.

(10) Patent No.: US 10,083,120 B2
(45) Date of Patent: Sep. 25, 2018

(54) MEMORY SYSTEM, AND ADDRESS MAPPING METHOD AND ACCESS METHOD THEREOF

(71) Applicant: SK hynix Inc., Gyeonggi-do (KR)

(72) Inventors: Dong-Gun Kim, Gyeonggi-do (KR); Yong-Ju Kim, Seoul (KR); Sang-Gu Jo, Gyeonggi-do (KR); Do-Sun Hong, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/598,401

(22) Filed: May 18, 2017

(65) Prior Publication Data
US 2017/0371800 A1 Dec. 28, 2017

(30) Foreign Application Priority Data
Jun. 27, 2016 (KR) .................. 10-2016-0079970

(51) Int. Cl.
*G06F 12/12* (2016.01)
*G06F 12/10* (2016.01)
*G06F 3/06* (2006.01)

(52) U.S. Cl.
CPC .............. *G06F 12/10* (2013.01); *G06F 3/064* (2013.01); *G06F 3/0616* (2013.01); *G06F 3/0673* (2013.01); *G06F 2212/1036* (2013.01); *G06F 2212/657* (2013.01)

(58) Field of Classification Search
CPC ........ G06F 12/10; G06F 3/0616; G06F 3/0673
USPC ......................................................... 711/203
See application file for complete search history.

(56) References Cited

U.S. PATENT DOCUMENTS

| | | | |
|---|---|---|---|
| 2005/0132127 A1* | 6/2005 | Chung ................ | G06F 12/0246 711/103 |
| 2007/0157001 A1* | 7/2007 | Ritzau ..................... | G06F 12/08 711/170 |

FOREIGN PATENT DOCUMENTS

| | | |
|---|---|---|
| KR | 1020150042931 | 4/2015 |
| KR | 1020150119921 | 10/2015 |

* cited by examiner

*Primary Examiner* — Jae Yu
(74) *Attorney, Agent, or Firm* — IP & T Group LLP (57) ABSTRACT

Provided is a method for mapping a logical address to a physical address, including: identifying whether a logical address is identical to a round value; mapping the logical address to a first physical address identical to an interval value when the logical address is identical to the round value; mapping the logical address to a second physical address corresponding to a value obtained by subtracting the round value from the logical address when the logical address is different from the round value; and adjusting a mapping value of the logical address to the second physical address to a value obtained by subtracting one from the second physical address when the second physical address is less than or equal to the interval value.

19 Claims, 9 Drawing Sheets

| LBA | PBA |
|---|---|
| 0 | 0 |
| 1 | 2 |
| 2 | 1 |
| 3 | 3 |

FIG. 8B

| LBA | PBA |
|---|---|
| 0 | 0 |
| 1 | 2 |
| 2 | 3 |
| 3 | 1 |

FIG. 8C

| LBA | OFFSET |
|---|---|
| 0 | 0 |
| 1 | 0 |
| 2 | 3 |
| 3 | 2 |

FIG. 9

MEMORY SYSTEM, AND ADDRESS MAPPING METHOD AND ACCESS METHOD THEREOF

CROSS-REFERENCE TO RELATED APPLICATIONS

The present application claims priority of Korean Patent Application No. 10-2016-0079970, filed on Jun. 27, 2016, which is incorporated herein by reference in its entirety.

BACKGROUND

1. Field

Exemplary embodiments of the present invention relate generally to a memory system including a memory device and a memory controller which controls the memory device.

2. Description of the Related Art

In memory devices, such as a NAND flash memory or a phase-change random access memory (PCRAM), the number of write operations to be performed on one cell before the cell becomes unreliable is limited. For example, in a PCRAM, the number of write operations is generally limited to approximately to about $10^6$ to $10^8$ operations.

When write operations are concentrated on a specific cell region, the service life of a memory device may be rapidly reduced because when the specific region becomes unreliable the whole memory device can no longer be used and must be discarded. To prevent this from happening, most memory devices perform a wear leveling operation that distributes write operations more uniformly through the cell regions of a memory device. A widely used wear leveling method changes address mapping between logical addresses and physical addresses so that the entire cell regions of a memory device can be used more evenly.

A well-known address mapping algorithm used in wear leveling operations is the start-gap algorithm. The start-gap algorithm changes address mapping while circulating a gap unused in a memory device. However, the start-gap algorithm increases the number of bits of an address due to addition of a gap, and therefore the memory device capacity must also increase.

SUMMARY

Various embodiments are directed to provide an improved more efficient address mapping method for wear leveling.

In an embodiment, a method for mapping a logical address to a physical address may include: identifying whether a logical address is identical to a round value; mapping the logical address to a first physical address identical to an interval value when the logical address is identical to the round value; mapping the logical address to a second physical address corresponding to a value obtained by subtracting the round value from the logical address when the logical address is different from the round value; and adjusting a mapping value of the logical address to the second physical address to a value obtained by subtracting one from the second physical address when the second physical address is less than or equal to the interval value.

The interval value may vary when the number of instances that a specific operation is performed reaches a threshold value.

The interval value may range from 1 to (N−1), and the round value varies when the interval value circulates once.

The specific operation may comprise at least one of a write operation and an erase operation.

The interval value (I) may be determined in a manner of "$I_{post-variation} = (I_{pre-variation} \bmod (N-1))+1$", where "N" denotes a total number of regions indicated by the physical address, and the round value (R) may be determined in a manner of "$R_{post-variation} = (R_{pre-variation}+1) \bmod N$".

In an embodiment, a memory system may include: a memory device comprising a plurality of memory cells to be accessed by a physical address; and a memory controller for controlling the memory device, wherein one of the memory device and the memory controller comprises at least one address mapping circuit for mapping a logical address to the physical address, wherein the address mapping circuit maps the logical address to a first physical address identical to an interval value when the logical address is identical to a round value, maps the logical address to a second physical address corresponding to a value obtained by subtracting the round value from the logical address when the logical address is different from the round value, and adjusts a mapping value of the logical address to the second physical address to a value obtained by subtracting one from the mapped physical address when the value obtained by subtracting the round value from the logical address is less than or equal to the interval value.

The interval value may vary when the number of instances a specific operation is performed reaches a threshold value.

Interval value may range from 1 to (N−1), and the round value may vary when the interval value circulates once.

The specific operation may comprise at least one of a write operation and an erase operation.

The interval value (I) may be determined in a manner of "$I_{post-variation} = (I_{pre-variation} \bmod (N-1))+1$", where "N" denotes a total number of regions indicated by the physical address, and the round value (R) may be determined in a manner of "$R_{post-variation} = (R_{pre-variation}+1) \bmod N$".

In an embodiment, a memory system may include: a memory device comprising a plurality of large regions each region comprising a plurality of small regions, and configured to be accessed by a physical large-region address and a physical small-region address; and a memory controller for controlling the memory device, wherein at least one of the memory device and the memory controller comprises at least one address mapping circuit for mapping a logical large-region address to the physical large-region address, wherein the address mapping circuit comprises: a first address mapping table storage unit for storing a first mapping value representing a pre-variation mapping relation between the logical large-region address and the physical large-region address; a second address mapping table storage unit for storing a second mapping value representing a post-variation mapping relation between the logical large-region address and the physical large-region address; an offset table storage unit for storing an offset representing a physical small-region up to which a data swap of a mapping-changed logical large-region has been performed; and a mapping unit for mapping the logical large-region address to the physical large-region address using information stored in the first address mapping table storage unit, the second address mapping table storage unit, and the offset table storage unit.

When the first mapping value is different from the second mapping value, the mapping unit maps the logical large-region address to the physical large-region address according to the first mapping value when a physical small-region address to be accessed is less than or equal to the offset, and maps the logical large-region address to the physical large-region address according to the second mapping value when the physical small-region address to be accessed is greater than the offset.

Each of the plurality of large regions may be a memory block, and each of the plurality of small regions may be a page.

In an embodiment, a method for accessing a memory device which includes a plurality of large regions, each large region including a plurality of small regions, may include: identifying whether mapping values of a logical large-region address to a physical large-region address to be accessed are equal to each other in a first address mapping table storing a mapping value before a mapping operation and in a second address mapping table storing a mapping value after the mapping operation; when the mapping values stored in the first and second address mapping tables are different from each other, comparing a physical small-region address to be accessed with an offset value stored in an offset table, the offset value representing a physical small-region up to which a data swap of a mapping-changed logical large-region has been performed, and determining a target address mapping table to be used from the first address mapping table and the second address mapping table; and accessing the memory device using a mapping value of the target address mapping table.

The method may further include accessing the memory device using the mapping value of the second address mapping table when the mapping values stored in the first and second address mapping tables are equal to each other.

The determining of the address mapping table may include: determining the second address mapping table as the target address mapping table when the physical small-region address to be accessed is less than or equal to the offset value; and determining the first address mapping table as the target address mapping table when the physical small-region address to be accessed is greater than the offset value.

Each of the plurality of large regions is a memory block, and each of the plurality of small regions is a page.

BRIEF DESCRIPTION OF THE DRAWINGS

The above and other features and advantages of the present invention will become more apparent to those skilled in the art to which the present invention belongs by the following detailed description with reference to the attached drawings in which.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

Figure 1:
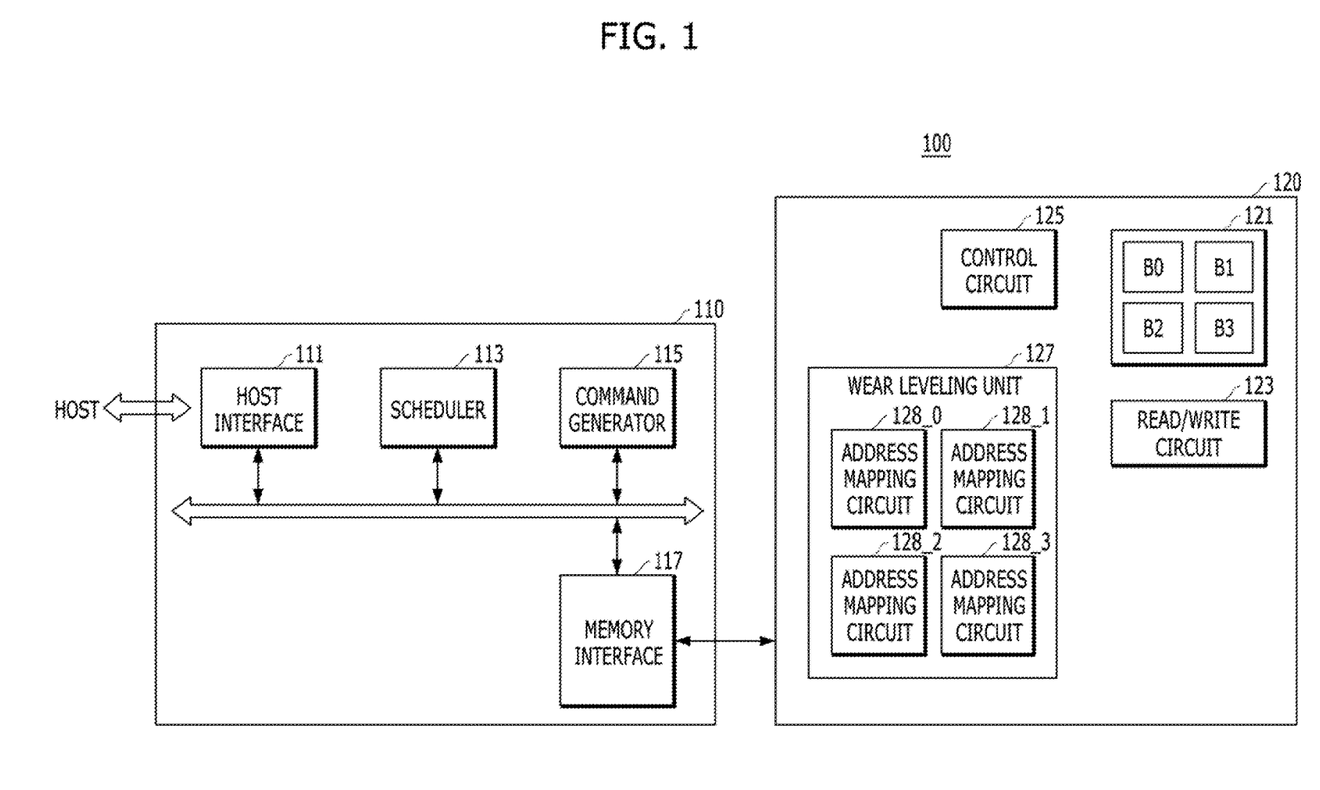
FIG. 1 is a block diagram illustrating a memory system, in accordance with an embodiment of the present invention.

Referring now to FIG. 1 is a memory system 100 is provided in accordance with an embodiment of the present invention.

According to FIG. 1, the memory system 100 may include a memory controller 110 operatively coupled to a memory device 120.

The memory controller 110 may control an operation of the memory device 120 in response to a request received from a host. The host may be any suitable electronic device and may include a central processing unit (CPU), a graphic processing unit (GPU), and the like. The memory controller 110 may include a host interface 111, a scheduler 113, a command generator 115, and a memory interface 117 operatively coupled to an internal bus 114.

The host interface 111 may provide an interface between the memory controller 110 and the host. The requests from the host may be received through the host interface 111. Also, processing results of the requests may be transmitted to the host through the host interface 111.

With respect to the requests received from the host, the scheduler 113 may determine an operation performance order for performing operations corresponding to the received requests by the memory device 120. The scheduler may instruct the memory device 120 for performing the operations corresponding to the host requests in the operation performance order determined by the scheduler. To improve one or more performance characteristics of the memory device 120, the scheduler 113 may determine an operation performance order to be instructed to the memory device 120 that is different from the reception order of the requests received from the host. For example, although the reception order may include a first request for a read operation followed by a second request for a write operation, the scheduler may determine an operation performance order for the read and write operations so that the memory device 120 performs the write operation prior to the read operation based on one or more performance characteristics of the memory device 120.

The command generator 115 may generate commands such as a read command and a write command which may be applied to the memory device 120 according to the operation performance order determined by the scheduler 113.

The memory interface 117 may provide an interface between the memory controller 110 and the memory device 120. Through the memory interface 117, the commands generated by the command generator 115 and related addresses may be transferred from the memory controller 110 to the memory device 120. Also through the memory interface 117 data corresponding to a command may be transmitted and received between the memory device 120 and the memory controller 110. For example, in a read command, read data which are read from a memory location of the memory device 120 may be transmitted to the memory interface 117 of the controller 110 and from the controller 110 to the host. The read data is data stored in a memory location of the memory device which corresponds to an address communicated from the command generator 115 via the memory interface 117 to the memory device. The memory interface 117 may be referred to as a PHY interface. The memory interface may be any suitable interface. The addresses transferred from the memory controller 110 to the memory device 120 may include a logical address for selecting a memory location of the memory device from which data are to be read (in a read operation) or stored (in a write operation). For example, when the memory device includes a plurality of memory blocks, and each memory block includes a plurality of pages, the logical address may include a logical block address (LBA) for selecting a block to be accessed in the memory device 120, and a logical page address (LPA) for selecting a page to be accessed in the selected block.

The memory device 120 may perform a read operation, a write operation, and the like according to the control of the memory controller 110. The memory device 120 may include a cell array 121, a read/write circuit 123, a control circuit 125, and a wear leveling unit 127. The memory device 120 may include a memory device requiring a wear leveling operation because the number of write operations to be performed on a memory cell thereof is limited. For example, the memory device 120 may include a NAND flash memory or a phase-change random access memory (PCRAM) both of which have a limited service life.

The cell array 121 may include first to fourth memory blocks B0 to B3. Each of the first to fourth memory blocks B0 to B3 may include a plurality of pages, and each of the pages may include a plurality of memory cells. A page may be defined as a plurality of memory cells operatively coupled to the same word line. A memory block to be accessed among the first to fourth memory blocks B0 to B3 may be selected by a physical block address (PBA), and a page to be accessed in the selected memory block may be selected by a physical page address (PPA). For convenience of description, it is assumed that each memory block includes eight pages. It is noted that the number of memory blocks in the cell array 121 and the number of pages in each memory block illustrated in the embodiment of FIG. 1 are mere examples for facilitating the description of the illustrated embodiment. Hence, any number of memory blocks and pages in each memory block may be employed without departing from the scope of the present embodiment and the present invention.

The read/write circuit 123 may read data from a selected page in a memory block selected in the cell array 121. The read/write circuit 23 may write data to a selected page in a memory block selected in the cell array 121. Any suitable read/write circuit 123 may be employed.

The wear leveling unit 127 may perform a mapping operation for wear leveling of the memory device 120. The wear leveling unit 127 may include first to fourth address mapping circuits 128_0 to 128_3. Each of the first to fourth mapping circuits 128_0 to 128_3 may correspond to one of the first to fourth memory blocks B0 to B3. The first to fourth address mapping circuits 128_0 to 128_3 may map logical page addresses (LPAs) of the respective memory blocks B0 to B3 to physical page addresses (PPAs). For example, the third address mapping circuit 128_2 may map the logical page address (LPA) of the third memory block B2 to the physical page address (PPA). For simplification of description, it is assumed that the wear leveling unit 127 does not perform an operation of mapping block addresses. That is, since the operation of mapping block addresses is not performed, the logical block address (LBA) may be identical to the physical block address (PBA). An address mapping circuit, among the first to fourth address mapping circuits 128_0 to 128_3, selected by a physical block address (PBA) may perform an operation of mapping page addresses. For example, when the second memory block B1 is selected by a physical block address (PBA), the second address mapping circuit 128_1 corresponding to the second memory block B1 may map a logical page address (LPA) to a physical page address (PPA).

The control circuit 125 may control the cell array 121, the read/write circuit 123, and the wear leveling unit 127 for performing at least one of a read operation and a write operation as instructed by a command received from the memory controller 110. More specifically, the control circuit 125 may identify an operation instructed by the memory controller 110 by decoding a command received from the memory controller 110.

Figure 2:
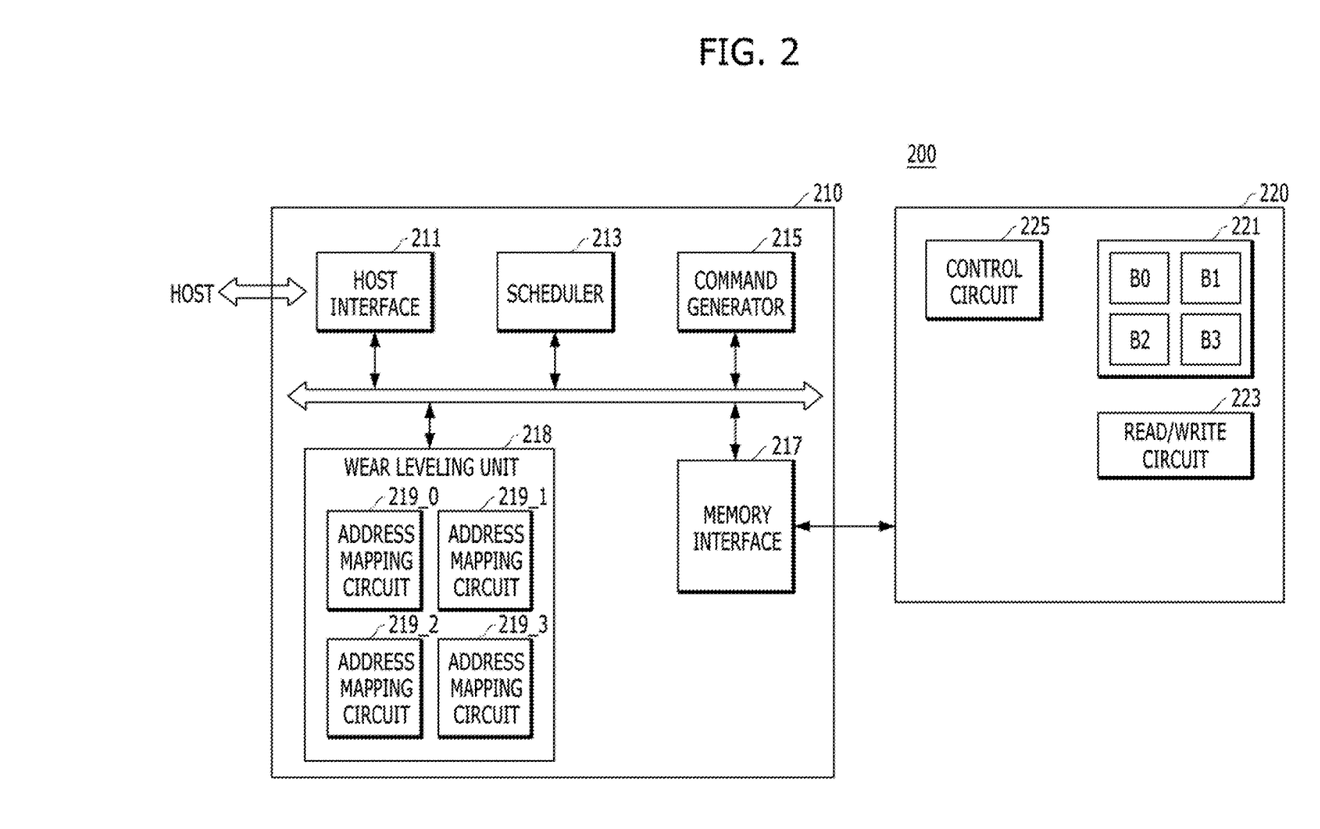
FIG. 2 is a block diagram illustrating a memory system, in accordance with another embodiment of the present invention.

Referring now to FIG. 2 a memory system 200 is provided, in accordance with another embodiment of the present invention.

According to FIG. 2, the memory system 200 may include a memory controller 210 operatively coupled to a memory device 220.

The memory controller 210 may control an operation of the memory device 220 in response to a request received from a host. The host may be any suitable electronic device. The host may be any suitable electronic device and may include a central processing unit (CPU), a graphic processing unit (GPU), and the like. The memory controller 210 may include a host interface 211, a scheduler 213, a command generator 215, a memory interface 217, and a wear leveling unit 218. The host interface 211, the scheduler 213, the command generator 215 and the memory interface 217 may be same or substantially the same as those of the host interface 111, the scheduler 113, the command generator 115 and the memory interface 117 shown in FIG. 1, respectively.

The wear leveling unit 218 may include first to fourth address mapping circuits 219_0 to 219_3 each corresponding to one of the first to fourth memory blocks B0 to B3. The first to fourth address mapping circuits 219_0 to 219_3 may map logical page addresses (LPAs) of the respective memory blocks B0 to B3 to physical page addresses (PPAs). The memory controller 210 shown in FIG. 2 may have the same configuration as the memory controller 110 shown in FIG. 1, except that the memory controller 210 also includes the wear leveling unit 218. In FIG. 2, since the wear leveling unit 218 is included in the memory controller 210, the memory controller 210 may transfer a physical block address (PBA) and a physical page address (PPA) to the memory device 220. The wear leveling unit 218, the host interface 211, the scheduler 213, the command generator 215, and the memory interface 217 are operatively coupled to an internal bus.

The memory device 220 may perform a read operation, a write operation, and the like according to the control of the memory controller 210. The memory device 220 may include a cell array 221, a read/write circuit 223, and a control circuit 225. The memory device 220 may include a memory device requiring a wear leveling operation because the number of write operations to be performed on a memory cell thereof is limited. For example, the memory device 220 may include a NAND flash memory or a phase-change random access memory (PCRAM) both of which may have a limited service life. The memory device 220 may have the same configuration as the memory device 120 shown in FIG. 1, except that the memory device 220 does not include a wear leveling unit.

Hereinafter, a mapping operation of the first to fourth address mapping circuits 128_0 to 128_3 and 219_0 to 219_3 shown in FIGS. 1 and 2 will be described.

In the mapping operation, an interval value (I) and a round value (R) are used. A description for the interval value (I) and the round value (R) will be first given.

The interval value (I) may vary whenever the number of performed instances for a specific operation reaches a threshold value. A specific operation may be at least one of a write operation and an erase operation. The interval value (I) may be allocated to each of the first to fourth address mapping circuits 128_0 to 128_3 and 219_0 to 219_3. For example, the interval value (I) of the third address mapping circuit 128_2 may vary whenever a write operation to the third memory block B2 is performed 128 times, and the interval value (I) of the fourth address mapping circuit 128_3 may vary whenever a write operation to the fourth memory block B3 is performed 128 times. The interval value (I) may have a value in a range from 1 to (N−1), and may vary in such a manner as to increase by one each time the specific operation is performed a number of instances that is equal to the threshold value. When the current interval value (I) becomes (N−1), the following interval value (I) will be 1. "N" represents the total number of regions indicated by a physical address to be mapped. Since it is exemplified that the number of pages indicated by the physical page address (PPA) is eight, N may be set to eight. When the interval value (I) may be expressed as a formula, "$I_{post-variation}=(I_{pre-variation}\ mod\ (N-1))+1$". Here, "mod" represents a mod function (m, n) which returns the remainder of m divided by n, where m corresponds to $I_{pre-variation}$ and n corresponds to (N−1).

The round value (R) may vary whenever the interval value (I) reaches (N−1) from 1. That is, the round value (R) may vary when the interval value (I) circulates once. When the interval value (I) becomes 1 after reaching to (N−1) from 1, the round value (R) may vary. The round value (R) may have a value in a range from 0 to (N−1), and may vary in such a manner as to increase by one each time. When the current round value (R) becomes (N−1), the following round value (R) will be zero. When the round value (R) may be expressed as a formula, "$R_{post-variation}=(R_{pre-variation}+1)\ mod\ N$". Similarly to the interval value (I), the round value (R) may be allocated to each of the first to fourth address mapping circuits 128_0 to 128_3 and 219_0 to 219_3.

Figure 3:
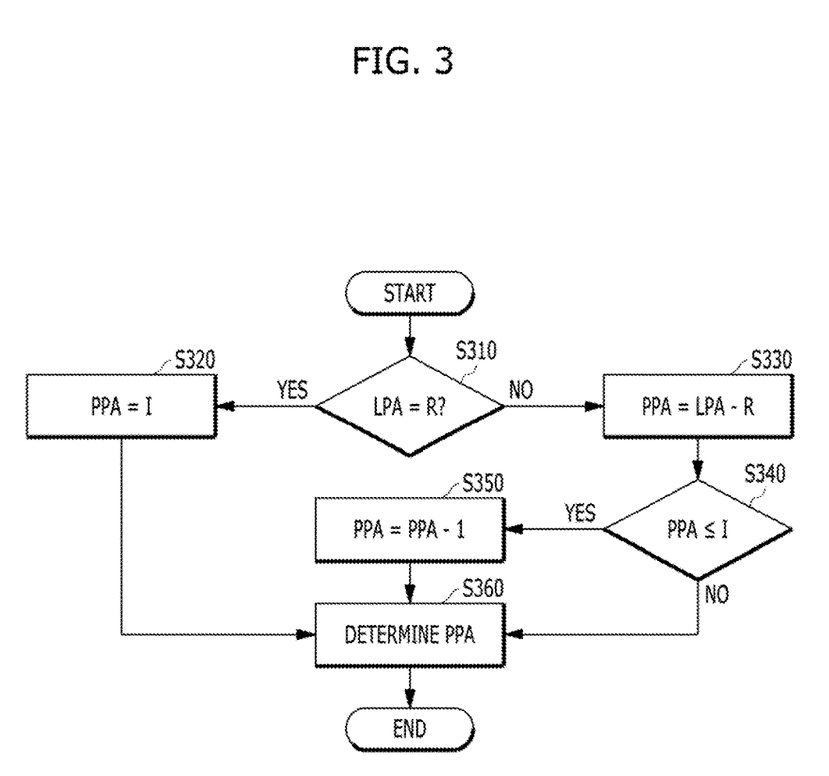
FIG. 3 is a flowchart illustrating a mapping operation of first to fourth address mapping circuits of the memory systems of FIGS. 1 and 2.

FIG. 3 is a flowchart illustrating a mapping operation of the first to fourth address mapping circuits 128_0 to 128_3 and 219_0 to 219_3 shown in FIGS. 1 and 2. Each of the first to fourth address mapping circuits 128_0 to 128_3 and 219_0 to 219_3 may operate as shown in FIG. 3.

Referring to FIG. 3, first, it may be identified whether or not a logical page address (LPA) to be accessed is equal to a round value (R) at step S310.

When the logical page address (LPA) is equal to the round value (R) ("YES" at step S310), the logical page address (LPA) may be mapped to a physical page address (PPA) which is identical to an interval value (I) at step S320. Then, the mapping value of the physical page address (PPA) may be determined at step S360.

When the logical page address (LPA) differs from the round value (R) ("NO" at step S310), the logical page address (LPA) may be mapped to a physical page address (PPA) which has a value obtained by subtracting the round value (R) from the logical page address (LPA), i.e., a value of "LPA−R" at step S330. Since it is exemplified that each of the first to fourth memory blocks B0 to B3 includes eight pages, a physical page address (PPA) may have a value in a range from 0 to 7. It means that the value of "LPA−R" being "−1" is the same as a value of "7", and the value of "−2" is the same as a value of "6". Such a mapping relation may be expressed as a formula, "$PPA=(LPA+N-R)\ mod\ N$".

At step S340, it may be determined whether or not the physical page address (PPA) mapped at step S330 is less than or equal to an interval value (I).

When it is determined that the physical page address (PPA) mapped at step S330 is less than or equal to the interval value (I) ("YES" at step S340), the mapped physical page address (PPA) may be adjusted to be reduced by one at step S350. Then, the mapping value of the physical page address (PPA) adjusted at step S350 may be determined at step S360.

When it is determined that the physical page address (PPA) mapped at step S330 is greater than the interval value (I) ("NO" at step S340), the mapping value of the physical page address (PPA) mapped at step S330 may be determined at step S360.

Figure 4:
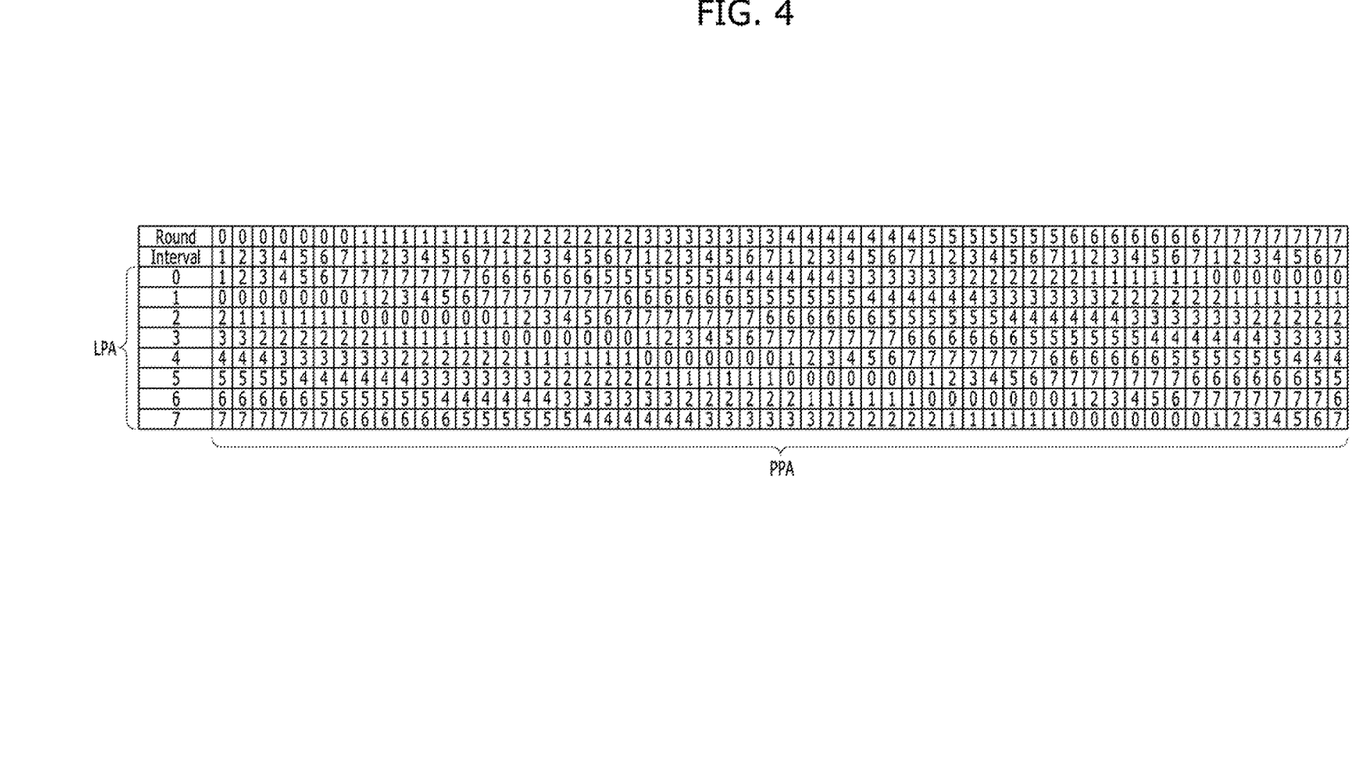
FIG. 4 is a table showing the mapping operation shown in FIG. 3 according to changes in an interval value (I) and a round value (R)

FIG. 4 is a table showing the mapping operation shown in FIG. 3 according to changes in the interval value (I) and the round value (R). FIG. 4 shows how the logical page address (LPA) is mapped to the physical page address (PPA) according to the changes in the interval value (I) and the round value (R) shown in FIG. 3. Numerals are values in which a logic page designated by the logical page address (LPA) and a physical page designated by the physical page address (PPA) are expressed as decimal numbers.

Referring to FIG. 4, it can be identified which physical pages are mapped with the logical pages of 0 to 7 depending on the interval value (I) and the round value (R). For example, when the round value (R) is 1 and the interval value (I) is 3, LPA (0, 1, 2, 3, 4, 5, 6, 7) may be mapped to PPA (7, 3, 0, 1, 2, 4, 5, 6); and when the round value (R) is 4 and the interval value (I) is 1, LPA (0, 1, 2, 3, 4, 5, 6, 7) may be mapped to PPA (4, 5, 6, 7, 1, 0, 2, 3). Referring to FIG. 4, it can be identified that logical pages are circularly and evenly mapped to physical pages according to the changes in the round value (R) and the interval value (I). When such a mapping method is used, write operations to a memory device are evenly distributed to all the pages, and thus the service life of the memory device may be extended.

In FIGS. 1 to 4, although it is exemplified that the address mapping method of FIGS. 3 and 4 is used to map a logical page address (LPA) to a physical page address (PPA), the present invention is not limited thereto. Such a mapping method may be used to map not only the page addresses but also addresses in larger or smaller units than that of the page addresses.

Figure 5:
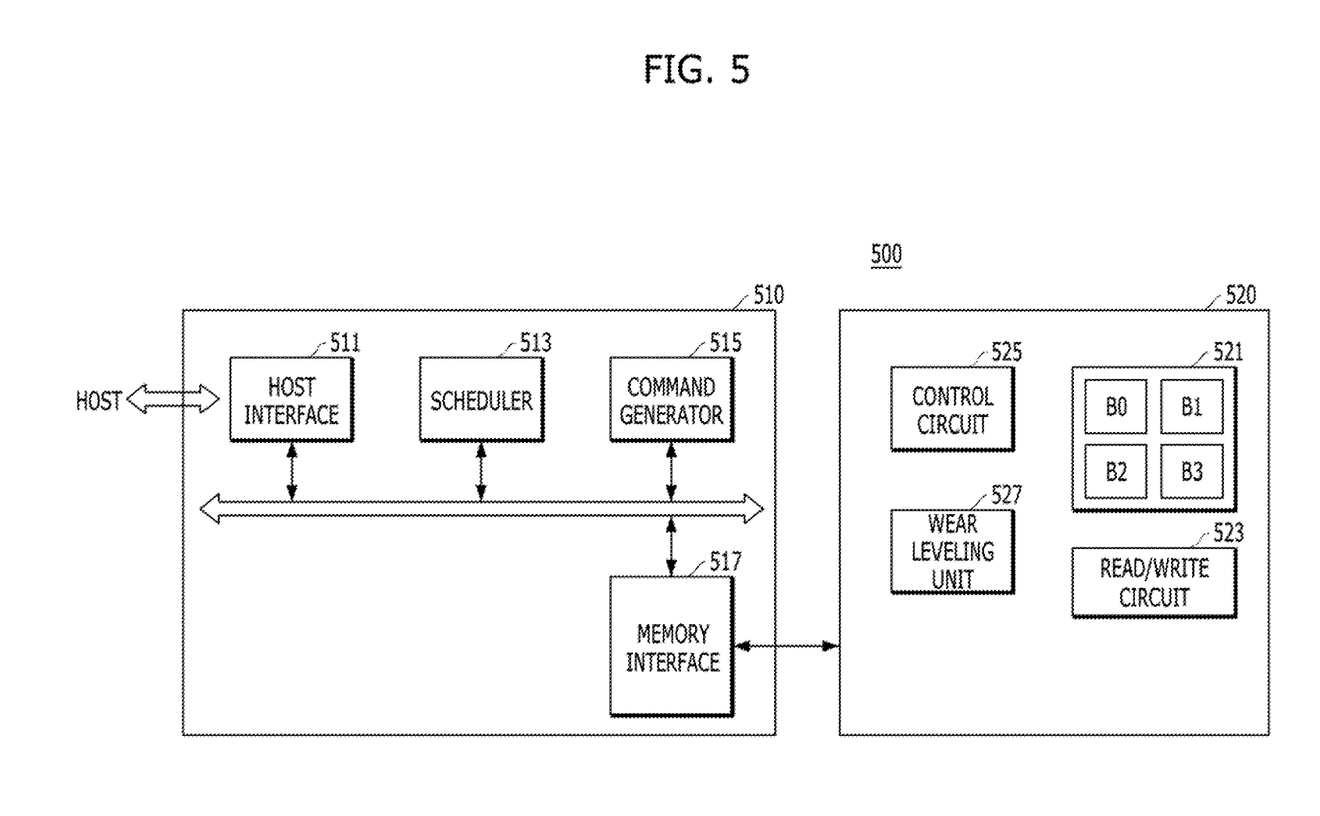
FIG. 5 is a block diagram illustrating a memory system, in accordance with yet another embodiment of the present invention.

FIG. 5 is a block diagram illustrating a memory system 500, in accordance with yet another embodiment of the present invention.

Referring to FIG. 5, the memory system 500 may include a memory controller 510 operatively coupled to a memory device 520.

The memory controller 510 may include a host interface 511, a scheduler 513, a command generator 515, and a memory interface 517 operatively coupled to an internal bus. The memory controller 510 shown in FIG. 5 may have the same or substantially the same configuration as the memory controller 110 shown in FIG. 1.

The memory device 520 may perform a read operation, a write operation, and the like according to the control of the memory controller 510. The memory device 520 may include a cell array 521, a read/write circuit 523, a control circuit 525, and a wear leveling unit 527. The memory device 520 may include a memory device requiring a wear leveling operation because the number of write operations to be performed on a memory cell thereof is limited. For example, the memory device 520 may include a NAND flash memory or a phase-change random access memory (PCRAM) of which the service life is limited. The cell array 521, the read/write circuit 523, and the control circuit 525 of the memory device 520 may have the same configurations as those of the cell array 121, the read/write circuit 123 and the control circuit 125 of the memory device 120 shown in FIG. 1, respectively.

The wear leveling unit 527 may perform an address mapping operation for wear leveling of the memory device 520. The wear leveling unit 527 may map a logical block address (LBA) to a physical block address (PBA). For simplification of description, it is assumed that the wear leveling unit 527 does not perform an operation of mapping page addresses. That is, since the operation of mapping page addresses is not performed, a logical page address (LPA) may be identical to a physical page address (PPA). The configuration and operation of the wear leveling unit 527 will be described in detail with reference to FIGS. 7 to 9.

Figure 6:
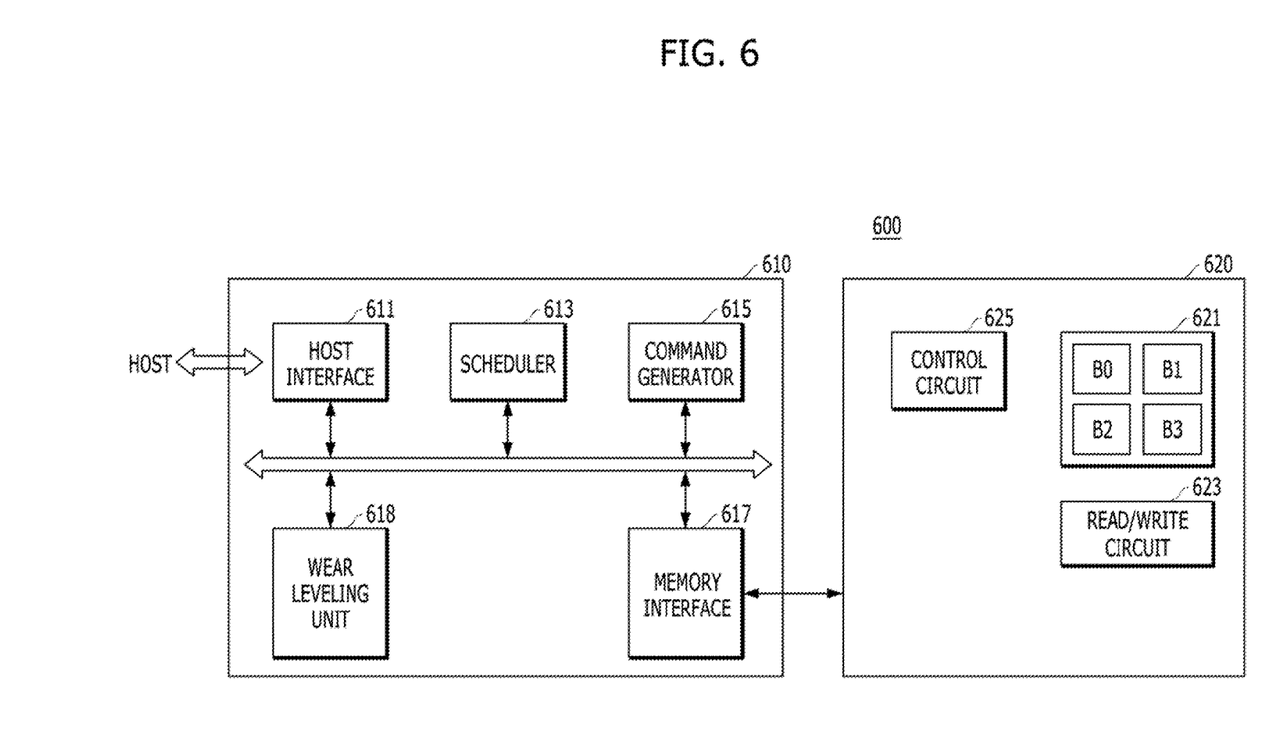
FIG. 6 is a block diagram illustrating a memory system, in accordance with yet another embodiment of the present invention.

FIG. 6 is a block diagram illustrating a memory system 600 in accordance with yet another embodiment of the present invention.

Referring to FIG. 6, the memory system 600 may include a memory controller 610 operatively coupled to a memory device 620.

The memory controller 610 may control an operation of the memory device 520 in response to a request received from a host. The host may be any suitable electronic device and may include a central processing unit (CPU), a graphic processing unit (GPU), and the like. The memory controller 610 may include a host interface 611, a scheduler 613, a command generator 615, a memory interface 617, and a wear leveling unit 618 operatively coupled to an internal bus. The host interface 611, the scheduler 613, the command generator 615 and the memory interface 617 of the memory controller 610 may have the same or substantially the same configurations as those of the host interface 211, the scheduler 213, the command generator 215 and the memory interface 217 of the memory controller 210 shown in FIG. 2, respectively.

The wear leveling unit 618 may perform an address mapping operation for wear leveling of the memory device 620. The wear leveling unit 618 may map a logical block address (LBA) to a physical block address (PBA). For simplification of description, it is assumed that the wear leveling unit 618 does not perform an operation of mapping page addresses. That is, since the operation of mapping page addresses is not performed, a logical page address (LPA) may be identical to a physical page address (PPA). The configuration and operation of the wear leveling unit 618 will be described in detail with reference to FIGS. 7 to 9.

In FIG. 6, since the wear leveling unit 618 is included in the memory controller 610, the memory controller 610 may transfer the physical block address (PBA) and the physical page address (PPA) to the memory device 620.

The memory device 620 may include a cell array 621, a read/write circuit 623, and a control circuit 625. The memory device 620 may have the same configuration as the memory device 220 shown in FIG. 2.

Figure 7:
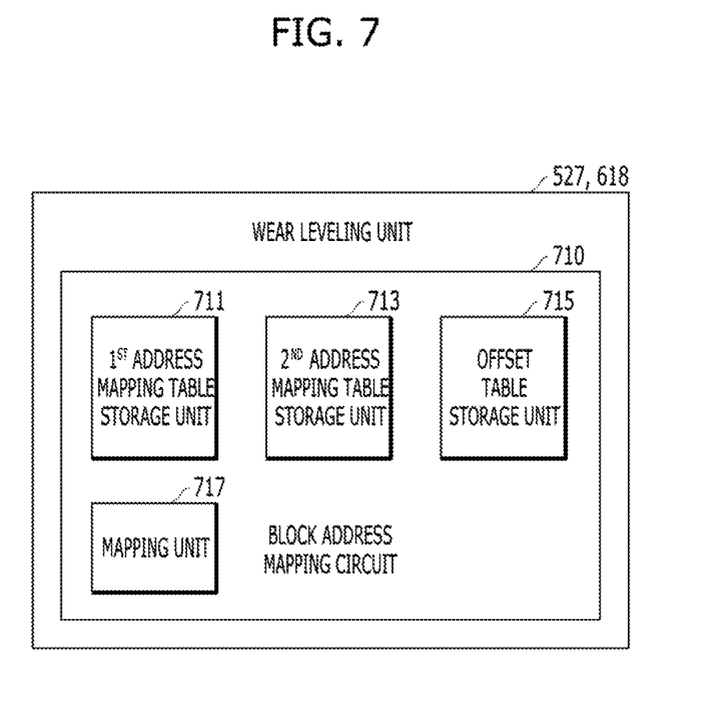
FIG. 7 is a block diagram illustrating an example configuration for the wear leveling units shown in FIGS. 5 and 6.

FIG. 7 is a block diagram illustrating the wear leveling units 527 and 618 shown in FIGS. 5 and 6.

Referring to FIG. 7, each of the wear leveling units 527 and 618 may include a block address mapping circuit 710. Here, since the case where the wear leveling unit 527 and 618 maps block addresses but does not map page addresses is exemplified, the wear leveling unit 527 and 618 is illustrated to include only a block address mapping circuit 710. However, when the wear leveling unit 527 and 618 maps page addresses, the wear leveling unit 527 and 618 may additionally include a circuit therefor.

The block address mapping circuit 710 may include a first address mapping table storage unit 711, a second address mapping table storage unit 713, an offset table storage unit 715, and a mapping unit 717.

The first address mapping table storage unit 711 may store a pre-variation mapping relation between a logical block address (LBA) and a physical block address (PBA) after the latest mapping operation for wear leveling of a memory device. The second address mapping table storage unit 713 may store a post-variation mapping relation between a logical block address (LBA) and a physical block address (PBA) prior to the latest mapping operation for wear leveling of the memory device. That is, the latest mapping relation between a logical block address (LBA) and a physical block address (PBA) may be stored in the second address mapping table storage unit 713, and an immediately preceding mapping relation therebetween may be stored in the first address mapping table storage unit 711.

The offset table storage unit 715 may store an offset which represents a physical page up to which a data swap of a mapping-changed logical block address has been performed. When the mapping relation between the logical block address (LBA) and the physical block address (PBA) has been changed, data may be swapped according to the changed mapping relation. In this case, the entire data of a block cannot be swapped at a time, but must be swapped in a unit of page. Here, the offset may represent a page, in a block to be swapped, up to which a data swap has been performed.

The mapping unit 717 may perform a mapping operation for wear leveling of a memory device to change a mapping relation between the logical block address (LBA) and the physical block address (PBA). As the simplest algorithm, an algorithm for swapping a logical block to which the largest number of write operations have been performed and a logical block to which the smallest number of write operations have been performed with each other according to each predetermined cycle may be used. A pre-variation mapping relation may be stored in the first address mapping table storage unit 711, and a post-variation mapping relation may be stored in the second address mapping table storage unit 713. The mapping unit 717 may map the logical block address (LBA) to the physical block address (PBA) upon a memory access using information stored in the first address mapping table storage unit 711, the second address mapping table storage unit 713 and the offset table storage unit 715, which will be described in detail with reference to FIGS. 8 and 9.

Figure 8A:
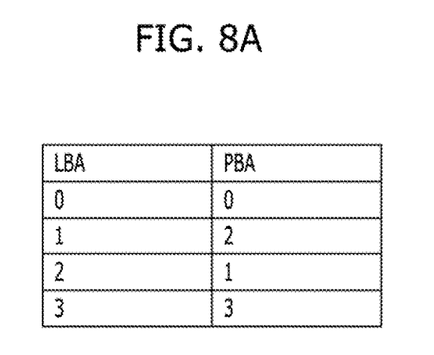
FIGS. 8A to 8C are diagrams showing an example of information stored in a first address mapping table storage unit, a second address mapping table storage unit and an offset table storage unit shown in FIG. 7, respectively.
Figure 8B:
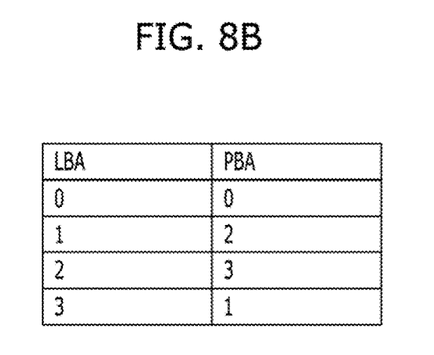
Figure 8C:
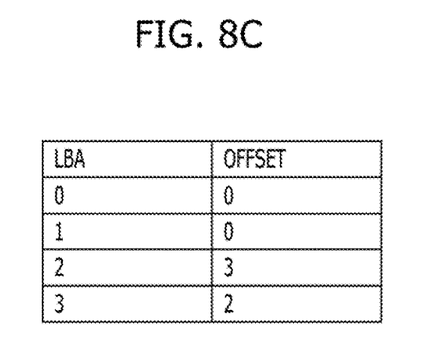

FIGS. 8A to 8C are diagrams showing an example of information stored in the first address mapping table storage unit 711, the second address mapping table storage unit 713 and the offset table storage unit 715 shown in FIG. 7, respectively.

Referring to FIG. 8A, a mapping relation between a logical block address (LBA) and a physical block address (PBA) which is stored in the first address mapping table storage unit 711, is shown. It can be identified that LBA (0, 1, 2, 3) is mapped to PBA (0, 2, 1, 3).

Referring to FIG. 8B, a mapping relation between a logical block address (LBA) and a physical block address (PBA) which is stored in the second address mapping table storage unit 713, is shown. It can be identified that the mappings of logical block #0 and logical block #1 are not changed, but the mappings of logical block #2 and logical block #3 are changed with respect to the values stored in the first address mapping table storage unit 711.

Referring to FIG. 8C, an offset value stored in the offset table storage unit 715 is shown. Since the mappings of logical block #0 and logical block #1 are not changed, the offset values thereof are zero which is an initial value. Since the mappings of logical block #2 and logical block #3 are changed, offset values representing degrees of data swap completed are stored therein. Referring to FIG. 8C, since the offset value of logical block #2 is three, it can be understood that a data swap has been performed up to physical page "3" with respect to logical block #2. In addition, since the offset value of logical block #3 is two, it can be understood that a data swap has been completed up to physical page "2" with respect to logical block #3.

After a data swap of a mapping-changed logical block has been completed, the mapping values stored in the second address mapping table storage unit 713 are updated to the first address mapping table storage unit 711, so that the first address mapping table storage unit 711 and the second address mapping table storage unit 713 may have the same mapping values.

Meanwhile, FIG. 8C illustrates the case in which the offset table storage unit 715 stores offset values of all logical blocks. However, in order to save storage capacity, the offset table storage unit 715 may be configured to store offset values of only mapping-changed logical blocks (for example, the logical block #2 and the logical block #3).

Figure 9:
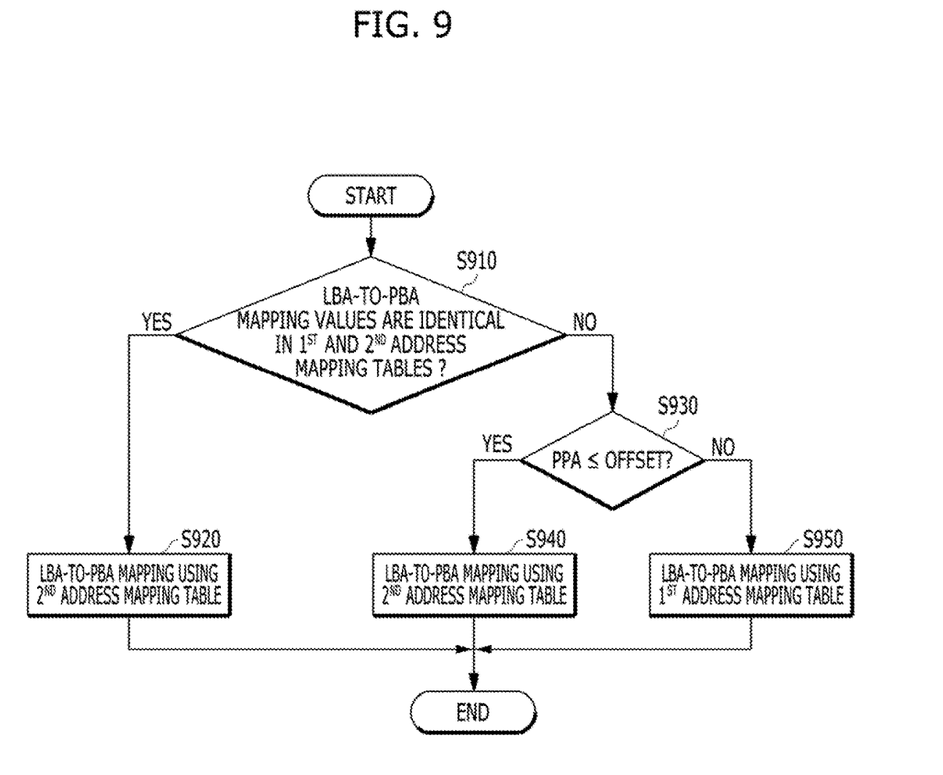
FIG. 9 is a flowchart illustrating a mapping operation performed by a mapping unit shown in FIG. 7, according to yet another embodiment of the present invention.

FIG. 9 is a flowchart illustrating a mapping operation performed by the mapping unit 717 shown in FIG. 7.

Referring to FIG. 9, it may be determined whether or not mapping values of a logical block address (LBA) to a physical block address (PBA) to be accessed are equal to each other in a first address mapping table and a second address mapping table at step S910.

When the mapping values in the first and second address mapping tables are the identical to each other as a result of the determination at step S910 ("YES" at step S910), the logical block address (LBA) may be mapped to the physical block address (PBA) using the mapping value of the second address mapping table at step S920. In this case ("YES" at step S910), since the mapping value of the first address mapping table is identical to the mapping value of the second address mapping table, the logical block address (LBA) may be mapped to the physical block address (PBA) using the mapping value of the first address mapping table. Since logical block #0 and logical block #1 in FIGS. 8A to 8C have the same mapping value in the first and second address mapping tables, a mapping operation such as step S920 may be performed.

When the mapping values in the first and second address mapping tables are different from each other as a result of the determination at step S910 ("NO" at step S910), an offset value of a logical block address (LBA) to be accessed may be compared with a physical page address (PPA) to be accessed at step S930. Here, since it is assumed that a page address mapping is not performed, the logical page address (LPA) is identical to the physical page address (PPA).

When the physical page address (PPA) is less than or equal to the offset value as a result of comparison at step S930 ("YES" at step S930), the logical block address (LBA) may be mapped to the physical block address (PBA) using the second address mapping table at step S940. Since the physical page address (PPA) being less than or equal to the offset value means that a data swap has been completed up to a corresponding physical page of a logical block to be accessed, the second address mapping table is used. With respect to physical pages 0-3 of logical block #2 and physical pages 0-2 of logical block #3 in FIGS. 8A to 8C, a mapping operation such as step S940 may be performed.

When the physical page address (PPA) is greater than the offset value as a result of the comparison performed at step S930 ("NO" at step S930), the logical block address (LBA) may be mapped to the physical block address (PBA) using the first address mapping table at step S950. Since the physical page address (PPA) being greater than the offset value means that a data swap has not been performed to a corresponding physical page of a logical block to be accessed, the first address mapping table is used. With respect to physical pages 4-7 of logical block #2 and physical pages 3-7 of logical block #3 in FIGS. 8A to 8C, a mapping operation such as step S950 may be performed.

In accordance with the method discussed with reference to FIG. 9, a mapping operation may be properly performed even when a mapping table for a block has been changed and all the data in the block has not yet been swapped according to the newly changed mapping table.

Meanwhile, the method discussed with reference to FIG. 9 may be used not only in mapping of block addresses, but also in address mappings in a larger or smaller unit than a block.

According to the described embodiments of the present invention, a wear leveling operation of a memory device may be performed more efficiently.

Although various embodiments have been described for illustrative purposes, it will be apparent to those skilled in the art that various changes and modifications may be made without departing from the spirit and scope of the invention as defined in the following claims.

What is claimed is:
1. An address mapping method comprising:
identifying whether a logical address is identical to a round value;
mapping the logical address to a first physical address identical to an interval value when the logical address is identical to the round value;
mapping the logical address to a second physical address corresponding to a value obtained by subtracting the round value from the logical address when the logical address is different from the round value; and
adjusting a mapping value of the logical address to the second physical address to a value obtained by sub- tracting one from the second physical address when the second physical address is less than or equal to the interval value.

2. The address mapping method of claim 1, wherein the interval value varies when the number of instances that a specific operation is performed reaches a threshold value.

3. The address mapping method of claim 2, wherein the interval value may range from 1 to (N−1), and the round value varies when the interval value circulates once.

4. The address mapping method of claim 2, wherein the specific operation comprises at least one of a write operation and an erase operation.

5. The address mapping method of claim 3, wherein the interval value (I) is determined in a manner of "$I_{post-variation} = (I_{pre-variation} \bmod (N-1))+1$", where "N" denotes a total number of regions indicated by the physical address, and the round value (R) is determined in a manner of "$R_{post-variation} = (R_{pre-variation}+1) \bmod N$".

6. A memory system employing the address mapping method of claim 1 for performing a wear leveling operation.

7. The memory system of claim 6 comprising a phase-change random access memory.

8. A memory system comprising:
a memory device comprising a plurality of memory cells to be accessed by a physical address; and
a memory controller for controlling the memory device,
wherein one of the memory device and the memory controller comprises at least one address mapping circuit for mapping a logical address to the physical address,
wherein the address mapping circuit maps the logical address to a first physical address identical to an interval value when the logical address is identical to a round value, maps the logical address to a second physical address corresponding to a value obtained by subtracting the round value from the logical address when the logical address is different from the round value, and adjusts a mapping value of the logical address to the second physical address to a value obtained by subtracting one from the mapped physical address when the value obtained by subtracting the round value from the logical address is less than or equal to the interval value.

9. The memory system of claim 8, wherein the interval value varies when the number of instances a specific operation is performed reaches a threshold value.

10. The memory system of claim 9, wherein interval value may range from 1 to (N−1), and the round value varies when the interval value circulates once.

11. The memory system of claim 9, wherein the specific operation comprises at least one of a write operation and an erase operation.

12. The memory system of claim 10, wherein the interval value (I) is determined in a manner of "$I_{post-variation} = (I_{pre-variation} \bmod (N-1))+1$", where "N" denotes a total number of regions indicated by the physical address, and the round value (R) is determined in a manner of "$R_{post-variation} = (R_{pre-variation}+1) \bmod N$".

13. A memory system comprising:
a memory device comprising a plurality of large regions each region comprising a plurality of small regions, and configured to be accessed by a physical large-region address and a physical small-region address; and
a memory controller for controlling the memory device, wherein at least one of the memory device and the memory controller comprises at least one address mapping circuit for mapping a logical large-region address to the physical large-region address,
wherein the address mapping circuit comprises:
a first address mapping table storage unit for storing a first mapping value representing a pre-variation mapping relation between the logical large-region address and the physical large-region address;
a second address mapping table storage unit for storing a second mapping value representing a post-variation mapping relation between the logical large-region address and the physical large-region address;
an offset table storage unit for storing an offset representing a physical small-region up to which a data swap of a mapping-changed logical large-region has been performed; and
a mapping unit for mapping the logical large-region address to the physical large-region address using information stored in the first address mapping table storage unit, the second address mapping table storage unit, and the offset table storage unit.

14. The memory system of claim 13, wherein, when the first mapping value is different from the second mapping value,
the mapping unit maps the logical large-region address to the physical large-region address according to the first mapping value when a physical small-region address to be accessed is less than or equal to the offset, and
maps the logical large-region address to the physical large-region address according to the second mapping value when the physical small-region address to be accessed is greater than the offset.

15. The memory system of claim 13, wherein each of the plurality of large regions is a memory block, and each of the plurality of small regions is a page.

16. A method of accessing a memory device which comprises a plurality of large regions, each large region comprising a plurality of small regions, the method comprising:
identifying whether mapping values of a logical large-region address to a physical large-region address to be accessed are equal to each other in a first address mapping table storing a mapping value before a mapping operation and in a second address mapping table storing a mapping value after the mapping operation;
when the mapping values stored in the first and second address mapping tables are different from each other, comparing a physical small-region address to be accessed with an offset value stored in an offset table, the offset value representing a physical small-region up to which a data swap of a mapping-changed logical large-region has been performed, and determining a target address mapping table to be used from the first address mapping table and the second address mapping table; and
accessing the memory device using a mapping value of the target address mapping table.

17. The method of claim 16, further comprising:
accessing the memory device using the mapping value of the second address mapping table when the mapping values stored in the first and second address mapping tables are equal to each other.

18. The method of claim 16, wherein the determining of the target address mapping table comprises:
determining the second address mapping table as the target address mapping table when the physical small-region address to be accessed is less than or equal to the offset value; and determining the first address mapping table as the target address mapping table when the physical small-region address to be accessed is greater than the offset value.

19. The method of claim 16, wherein each of the plurality of large regions is a memory block, and each of the plurality of small regions is a page.

* * * * *